United States Patent [19]

Willard, Jr.

[11] Patent Number: 5,226,633
[45] Date of Patent: Jul. 13, 1993

[54] SPRING DESIGN FOR USE IN THE CORE OF A NUCLEAR REACTOR

[75] Inventor: H. James Willard, Jr., Bethel Park, Pa.

[73] Assignee: The United States of America as represented by the United States Department of Energy, Washington, D.C.

[21] Appl. No.: 193,703

[22] Filed: May 13, 1988

[51] Int. Cl.⁵ .............................. F16F 1/18
[52] U.S. Cl. .................... 267/159; 267/47; 267/182; 376/441; 376/445
[58] Field of Search ............... 267/47, 283, 158, 159, 267/182; 188/276, 277; 376/441, 442, 445; 337/417

[56] References Cited

U.S. PATENT DOCUMENTS

| | | | |
|---|---|---|---|
| 1,870,235 | 8/1932 | Bush | 337/417 |
| 1,895,590 | 1/1933 | Spencer | 267/159 |
| 1,962,927 | 6/1934 | De Bats | 267/159 |
| 2,487,683 | 11/1949 | Wilson | 267/159 |
| 2,860,208 | 11/1958 | Epstein | 267/159 |
| 4,366,460 | 12/1982 | Forster et al. | 267/182 |
| 4,695,426 | 9/1987 | Nylund | 376/441 |

*Primary Examiner*—Andres Kashnikow
*Assistant Examiner*—Mark T. Le
*Attorney, Agent, or Firm*—William R. Moser; Judson R. Hightower; Richard E. Constant

[57] ABSTRACT

A spring design particularly suitable for use in the core of a nuclear reactor includes one surface having a first material oriented in a longitudinal direction, and another surface having a second material oriented in a transverse direction. The respective surfaces exhibit different amounts of irraditation induced strain.

2 Claims, 1 Drawing Sheet

Loaded Bi-Textured Spring

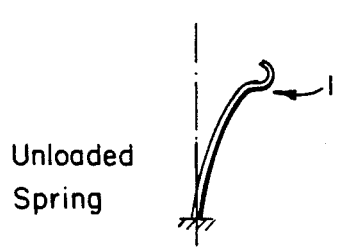
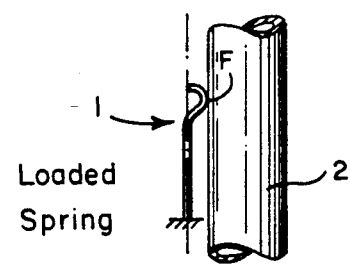
FIG. 1a Unloaded Spring
FIG. 1b Loaded Spring
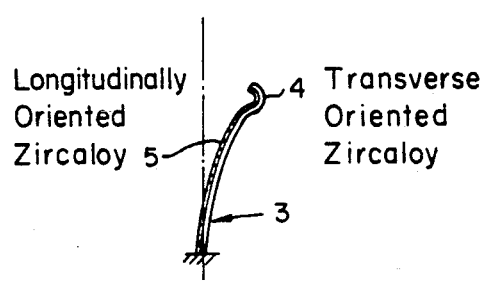
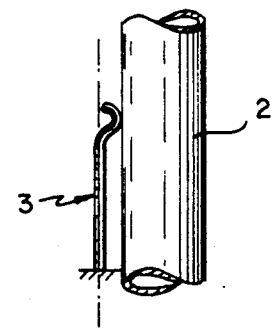
FIG. 2a Unloaded Bi-Textured Spring
FIG. 2b Loaded Bi-Textured Spring
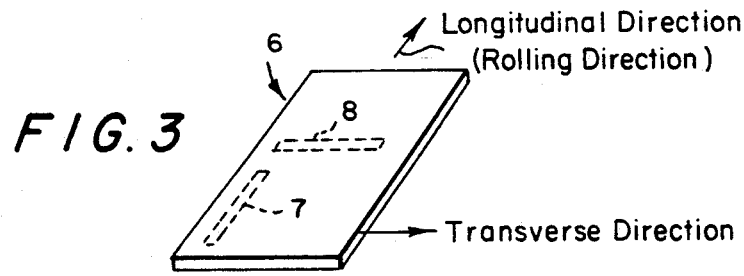
FIG. 3
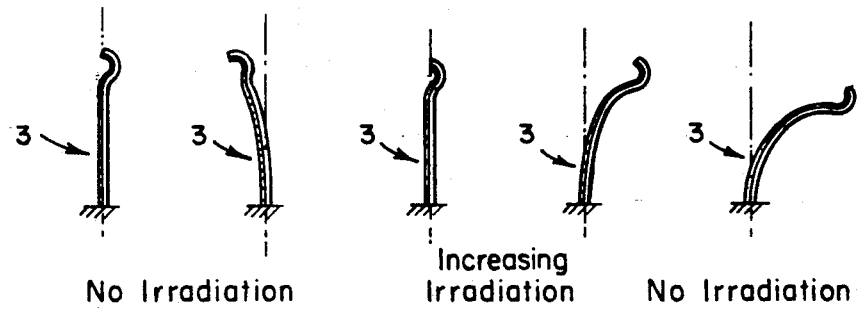
FIG.4a FIG.4b FIG.4c FIG.4d FIG.4e

SPRING DESIGN FOR USE IN THE CORE OF A NUCLEAR REACTOR

BACKGROUND OF THE INVENTION

1. Field of the Invention

The present invention relates to an improved spring design for an article of manufacture and, more specifically, the present invention relates to an improved spring design constructed of a bi-textured strip of materials which exhibit different amounts of irradiation induced strain for use in the core of a nuclear reactor.

2. Description of the Prior Art

The basic principle of concern of the present invention is that differential irradiation-induced growth strain will cause internal stresses to be generated in a spring. Distortion of nuclear reactor components occurring from this cause is a well known effect, and a fundamental problem which must be faced in the design of nuclear reactor cores. This type of problem is analogous to the problems which arise in the design of components due to stresses and strains caused by differential thermal expansion. There have been methods proposed to mitigate the effects of such differential growth in a radiation environment, but these have generally failed to achieve the results realized by the present invention.

FIG. 1 is a schematic illustration of the application of a conventional flat strip spring which is used to hold tubular fuel elements in place in a nuclear power reactor. FIG. 1(a) shows the spring 1 in an unloaded position. However, in FIG. 1(b), the spring 1 has been deformed elastically by inserting the fuel rod 2. This fuel rod 2 establishes membrane stresses through the cross-sectional area of the spring 1. The force F that the spring 1 exerts on the rod 2 will exist so long as these membrane stresses are maintained. During operation at high temperatures in the irradiation field of a nuclear power reactor, the stresses cannot be maintained due to the presence of accelerated stress relaxation.

As the stresses relax, the force exerted by the spring on the rod decreases. When this force falls below an acceptable design value, the rods will no longer be held securely, with the result that fretting, chattering and excessive wear of the rods can occur due to flow induced vibrations and other causes. Moreover, if the fuel rods are not properly spaced, nuclear and thermal performance of the reactor fuel assemblies can be adversely affected.

As discussed above, the design life of the conventional spring is limited by the degree of stress relaxation occurring. It is difficult to provide positive assurance that the required minimum force will still exist at the end of the core life with such conventional springs since data indicate stresses can relax to close to zero in the reactor environment. Although the springs are occasionally constructed of high strength materials (e.g. steel) to provide a high initial stress to obtain a longer life, often these materials are not compatible with the nuclear core design.

From the foregoing, it is clear that the need exists for an improved spring design for use in the core of a nuclear reactor which can exhibit varying amounts of irradiation-induced strain, producing bending stresses which reduce or eliminate the irradiation-induced relaxation of the desirable initial stresses loaded in the spring.

SUMMARY OF THE INVENTION

Accordingly, it is a primary object of the present invention to overcome the disadvantages of conventional springs used in the core of nuclear reactors.

It is a further object of the present invention to provide a spring constructed of a bi-textured strip of materials which exhibit different amounts of irradiation-induced strain.

It is still another object of the present invention to provide a bi-textured strip spring which employs differential irradiation-induced strains to produce bending stresses which reduce or eliminate the irradiation-induced relaxation of the desirable initial stresses loaded in the spring.

It is yet another object of the present invention to provide a spring which can be used to hold tubular fuel elements in place in a nuclear power reactor for long periods of time without deterioration of the critical properties.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 depicts a conventional flat strip spring, in both an unloaded (FIG. 1a) and elastically deformed (FIG. 1b) position, for holding tubular fuel elements in place in a nuclear reactor;

FIG. 2 is a schematic illustration of the bi-textured spring of the present invention, both unloaded (FIG. 2a) and loaded (FIG. 2b) condition;

FIG. 3 illustrates material to prepare a bi-textured spring of a piece cut from the longitudinal direction of a rolled zircomium based alloy plate bonded to a piece cut from the transverse direction of the same plate; and FIGS. 4a-4e illustrate the effect of differential irradiation induced strain on the spring of the present invention.

DETAILED DESCRIPTION

Further scope of applicability of the present invention will become apparent from the detailed description given hereinafter. However, it should be understood that the detailed description and examples, while indicating preferred embodiments of the invention, are given by way of illustration only, since various changes and modifications within the spirit and scope of the invention will become apparent to those skilled in the art from this detailed description.

The present invention is directed to a spring for use in a nuclear fuel reactor to hold tubular fuel elements in place. The spring is constructed having a first surface of material oriented in a longitudinal direction and a second surface of material oriented in a transverse direction, such that the two surfaces exhibit different amounts of irradiation induced strain to produce bending stresses which reduce or eliminate the irradiation-induced relaxation of the desirable initial stresses loaded in the spring. The exact configuration of the bi-textured strip spring is determined by the particular application. Metal is a possible material for use in the present spring, and zirconium-base alloys are particularly suitable for use as the materials in construction of the spring. Preferably, the spring is a bi-textured strip constructed of a transverse oriented zircomium based alloy and longitudinally oriented zircomimiun based alloy. Zircomium based alloy exhibits anisotropic irradiation induced strains, a central requirement for the design. A suitable zirconium-based alloy would preferably include alloys known under the trade name ZIRCALOY. This alloy is widely used in materials in the cores of nuclear power plants.

FIGS. 2(a) and 2(b) depict a bi-textured spring 3 constructed of a transverse oriented zircomium based alloy 4 and a longitudinally oriented zircomium based alloy 5; FIG. 2(a) illustrates the spring 3 in the unloaded position and FIG. 2(b) illustrates the spring 3 in a loaded position with fuel rod 2. A schematic illustration of the use of a bi-textured spring 3 of the present design is also shown in FIGS. 2(a) and 2(b).

FIG. 3 illustrates material for a bi-textured spring comprising a piece 7 cut from the longitudinal direction of a rolled zircomium based alloy plate 6 which will be bonded to a piece 8 cut from the transverse direction of the plate 6. A zircomium based alloy plate 6, such as shown in FIG. 3 will, as a result of irradiation in a nuclear reactor, plastically deform even in the absence of an applied stress. Particularly, the dimension in the longitudinal direction increases whereas the dimension in the transverse direction remains essentially constant. The increase in strain in the longitudinal direction is offset by a shrinkage in the thickness of the plate Thus, the difference in the amount of irradiation induced strain is the driving force for the successful operation of the bi-textured spring.

FIG. 4 illustrates the effect of differential irradiation induced strain on the spring 3 of the present invention. This figure shows a bi-textured spring 3 during heating from room temperature to operating temperature FIGS. 4(a)-4(b), during irradiation at operating temperature FIGS. 4(c)-4(d), and during cool down to room temperature FIG. 4(e).

In FIG. 4(a), the spring 3 is shown as constructed. FIG. 4(b) depicts the spring 3 as having been bent slightly to the left due to differential thermal expansion from the initial increase from room temperature to the operating temperature of the two pieces. The longitudinally oriented material has a lower coefficient of thermal expansion than the transverse oriented material. Upon irradiation, the spring 3 deflects to the right (FIGS. 4(c) and 4(d)) since the longitudinally oriented material on the left increases in length whereas the transverse material on the right essentially remains constant in dimension. The relative thickness of the pieces and the magnitude of the difference in irradiation induced strains determine whether the amount of bending becomes constant or continues to increase throughout the application of the irradiation. Finally, in FIG. 4(e), the irradiation field is no longer present and the spring 3 has cooled to room temperature. It is bent slightly further to the right due to differential thermal expansion.

The relative magnitude of the strain ($\Delta E_T$) due to differential thermal expansion is small relative to the differential irradiation induced strain for this application and thus it can essentially be neglected in the calculation of the total strain experienced by the spring. The differential thermal strain on the spring can be therefore estimated as follows:

$$\Delta \epsilon_T = (\alpha_{long} - \alpha_{trans}) \Delta T \degree C.$$

The following calculation would be a typical calculation of the differential thermal induced strain:

$$\Delta \epsilon_T = (6.6 \times 10^{-6} - 5.4 \times 10^{-6}) \degree C. \cdot 300 \degree C.$$

$$\Delta \epsilon = 3.6 \times 10^{-4}$$

wherein $long \degree C^{-1}$ and $trans \degree C^{-1}$ represent the coefficients of thermal expansion for longitudinal and transverse oriented zirconium based alloy, respectively.

The differential irradiation induced strain is usually of the order of magnitude of $10^{-3}$ to $5 \times 10^{-3}$, depending upon the degree of cold work of the material and irradiation dosage received. It is apparent that the effect of differential thermal expansion can be overcome by the irradiation induced strain. Differential thermal expansion can be compensated for during the early stages of core life by additional elastic strain.

The force required to maintain the bi-textured strip in a vertical position is superimposed on the initial force exerted by the rod on the spring. By properly selecting materials for the pieces and the relative thickness, the force exerted can decrease less rapidly or be sustained through the life of the spring.

The application of the bi-textured spring of the present invention is not limited to a strip configuration, and further it is not limited to supporting fuel rods. The application of the strip can extend to springs of the disc type or other configurations which can be utilized to reduce stress relaxation of bolts, fasteners and other devices used in an irradiation environment. The essential principle is to employ the phenomena of irradiation induced strains to produce stresses which counteract the relaxation of those initial stresses purposely built into the device, or to produce new desirable stress levels as the irradiation proceeds.

It is also posible to use beta-quenched or weld metal alloys as the non-straining member in application in the present invention. Similarly, the design could use as the straining member a material which increases its volume isotropically as a result of irradiation, coupled with one which has significantly less volumetric change.

Several methods exist for manufacturing the bi-textured springs of the present invention. For example in one such method, the two metal pieces can be roll bonded together.

It is possible to use dissimilar metals having a difference in irradiation induced strain properties and to bond them together to produce a bi-textured spring.

It is also possible to use a single material. When a single material is used, one side can be heat treated to achieve a composition which exhibits a significantly different magnitude of irradiation induced strain than the other side. For example, zircaloy can be heat treated to achieve a beta-quenched structure. On the other hand, one side of a single material can be cold worked (annealed) while the other side is not to thus produce a material having two surfaces which exhibit different amounts of irradiation induced strain.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An elongated, laminated, bi-textured spring for use in the core of a nuclear reactor comprising:
   a first strip of zirconium alloy which is cut from a plate of rolled zirconium alloy in the longitudinal direction of the plate,
   a second strip of zirconium alloy which is bonded to the first strip of zirconium alloy and which is cut from the same plate of rolled zirconium alloy as the first strip in a direction transverse to the longitudinal direction of the plate, so that the two strips exhibit different amounts of irradiation induced strain to produce bending stresses which reduce the irradiationinduced relaxation of the initial stresses loaded in the spring when the spring is formed.

2. An elongated, laminated, bi-textured spring for use in the core of a nuclear reactor comprising:
   a first strip of zirconium alloy which is cut from a plate of rolled zirconium alloy,
   a second strip of zirconium alloy which is bonded to the first strip of zirconium alloy and which is cut from the same plate of rolled zirconium alloy as the first strip in a direction which is transverse to the direction of the cut of the first strip, so that the first and second strips of the spring exhibit different amounts of irradiation induced strain to produce bending stresses in the spring which reduce the irradiationinduced relaxation of the initial stresses loaded in the spring when the spring is formed, wherein the first strip elongates in length under irradiation and the second strip remains essentially constant in length when irradiated.

* * * * *